(12) United States Patent
Qian et al.

(10) Patent No.: US 11,629,247 B2
(45) Date of Patent: Apr. 18, 2023

(54) POLYMER BLENDS WITH IMPROVED PROCESSABILITY FOR TPO ROOFING MEMBRANES AND METHODS FOR MAKING SAME

(71) Applicant: ExxonMobil Chemical Patents Inc., Baytown, TX (US)

(72) Inventors: Chen Qian, Houston, TX (US); Dayana M. Cevallos, Houston, TX (US); Felix M. Zacarias, Houston, TX (US)

(73) Assignee: EXXONMOBIL CHEMICALS PATENTS INC., Baytown, TX (US)

( * ) Notice: Subject to any disclaimer, the term of this patent is extended or adjusted under 35 U.S.C. 154(b) by 0 days.

(21) Appl. No.: 16/934,108

(22) Filed: Jul. 21, 2020

(65) Prior Publication Data
US 2021/0024733 A1    Jan. 28, 2021

Related U.S. Application Data

(60) Provisional application No. 62/877,355, filed on Jul. 23, 2019.

(51) Int. Cl.
| | |
|---|---|
| C08L 23/06 | (2006.01) |
| C08L 23/14 | (2006.01) |
| C08L 23/16 | (2006.01) |
| E04D 5/06 | (2006.01) |

(52) U.S. Cl.
CPC .............. *C08L 23/16* (2013.01); *C08L 23/06* (2013.01); *C08L 23/14* (2013.01); *E04D 5/06* (2013.01); *C08L 2205/025* (2013.01); *C08L 2207/066* (2013.01)

(58) Field of Classification Search
CPC .......... C08L 23/10; C08L 23/14; C08L 23/16; C08L 2205/025; E04D 5/06; E04D 12/00; E04D 12/06
See application file for complete search history.

(56) References Cited

U.S. PATENT DOCUMENTS

2007/0254130 A1    11/2007 Cheek
2019/0203006 A1*    7/2019 Abubakar ............. B32B 27/327

FOREIGN PATENT DOCUMENTS

| EP | 1 013 414 A | 6/2000 |
| WO | 2004/079083 A | 9/2004 |
| WO | 2016/137558 A | 9/2016 |

* cited by examiner

*Primary Examiner* — Irina S Zemel
*Assistant Examiner* — Jeffrey S Lenihan

(57) ABSTRACT

A polymer blend includes 35 to 50 wt % of at least one propylene-based elastomer, 25 to 50 wt % of at least one impact copolymer; and 15 to 25 wt % of at least one low density polyethylene component. The propylene-based elastomer has a heat of fusion less than about 80 J/g, greater than 50 wt % propylene and from about 3 wt % to about 25 wt % units derived from one or more C2 or C4-C12 α-olefins, based on a total weight of the propylene-based elastomer. The low density polyethylene has a density of about 0.90 $g/cm^3$ to about 0.94 $g/cm^3$. The polymer blend is useful for making a roofing membrane.

20 Claims, 6 Drawing Sheets

POLYMER BLENDS WITH IMPROVED PROCESSABILITY FOR TPO ROOFING MEMBRANES AND METHODS FOR MAKING SAME

This application claims priority to U.S. Ser. No. 62/877,355, filed Jul. 23, 2019, herein incorporated by reference.

FIELD

Embodiments of the present invention generally relate to polymer blends containing propylene-based elastomers.

BACKGROUND

Thermoplastic polyolefin (TPO) polymers have been used extensively in roofing applications for commercial buildings with flat roofs. Such roofing applications are typically a reflective roofing membrane made from blends of polypropylene and ethylene-propylene rubber and have a reflective white upper layer that gets exposed to sunlight and a pigmented layer underneath the reflective layer that is attached to a roof insulation material. TPO roofing sheets are installed using different methods including adhered, mechanically attached system, ballasted and plate bonded. The membrane is exposed throughout the life of the roof.

For roofing and other sheeting applications, the products are typically manufactured as membrane sheets having a typical width of 10 feet (3 meters) or greater, although smaller widths can be available. The sheets are typically sold, transported, and stored in rolls. For roofing membrane applications, several sheets are unrolled at the installation site, placed adjacent to each other with an overlapping edge to cover the roof and are sealed together by a heat welding process. During transport and storage, the rolls can be exposed to extreme heat conditions, such as from 40° C. to 100° C., which can lead to roll blocking of the rolls during storage in ware-house. In use, the membranes are exposed to a wide range of conditions that will deteriorate or destroy the integrity of the membrane after time. Generally speaking, roofing membranes should be able to withstand a wide variety of service temperatures, such as from −40° C. to +40° C.

The current TPO roofing market has been led by a reactor thermoplastic polyolefin ("RTPO") product from Lyondell-Basell called Hifax™ Ca10a. This RTPO product makes good quality, single ply TPO roofing sheets under high production rates. Propylene-based elastomers are thought be useful for making TPO roofing sheets. For example, a blend containing 50 wt % Vistamaxx™ (VMX) 6102 (a polymer having isotactic propylene repeat units with random ethylene distribution that is produced using ExxonMobil's proprietary metallocene catalyst technology) and 50 wt % impact polypropylene (ICP) 7032E2 provide comparable flexibility relative to that of the RTPO Hifax™ Ca10a. However, this 50/50 blend suffers from waving edge problems under the same production rate as the Hifax™ Ca10a. The melt strength and strain hardening of the 50/50 VMX/ICP blend is about 20% that of Hifax™ Ca10a, which is believed to be the cause of the edge problems.

There is a need, therefore, for a new polymer blend with improved melt strength and strain hardening capable of making quality single ply TPO roofing sheets under high production rates.

SUMMARY

A polymer blend comprises 35 to 50 wt % of at least one propylene-based elastomer having a heat of fusion less than about 80 J/g, wherein the propylene-based elastomer comprises greater than 50 wt % propylene and from about 3 wt % to about 25 wt % units derived from one or more C2 or C4-C12 α-olefins, based on a total weight of the propylene-based elastomer; 25 to 50 wt % of at least one impact copolymer; and 15 to 25 wt % of at least one low density polyethylene component having a density of about 0.90 g/cm$^3$ to about 0.94 g/cm$^3$. The polymer blend may be used in an article, for example, in a roofing membrane.

A roofing membrane comprises 60 wt % to 70 wt % of a polymer blend comprising 35 to 50 wt % of at least one propylene-based elastomer having a heat of fusion less than about 80 J/g, wherein the propylene-based elastomer comprises greater than 50 wt % propylene and from about 3 wt % to about 25 wt % units derived from one or more C2 or C4-C12 α-olefins, based on a total weight of the propylene-based elastomer; 25 to 50 wt % of at least one impact copolymer; and 15 to 25 wt % of at least one low density polyethylene component having a density of about 0.90 g/cm$^3$ to about 0.94 g/cm$^3$ 30 wt % to 40 wt % of masterbatch comprising an anti-ultraviolet agent, color pigment and fire retardant.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. It can be to be noted, however, that the appended drawings illustrate only typical embodiments of this invention and are therefore not to be considered limiting of its scope, for the invention can admit to other equally effective embodiments.

DETAILED DESCRIPTION

Figure 1:
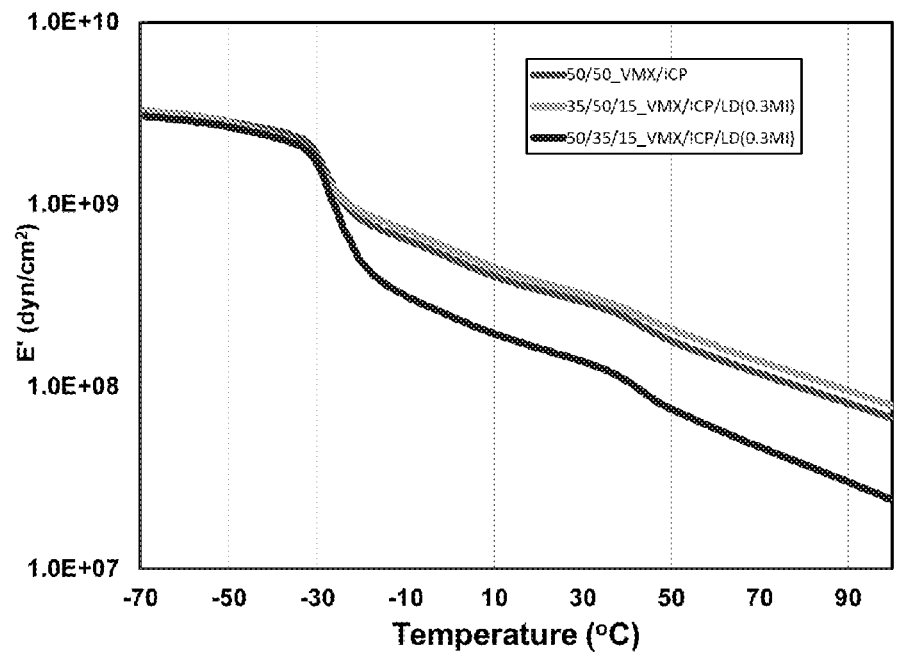
FIG. 1 is a graphical representation showing E' as a function of temperature (DMTA) for the experimental blends 3 to 5, according to one or more embodiments provided herein. The results of the Comp.Ex. #2 are also shown as a comparative reference.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Described herein are polymer blends comprising at least one propylene-based elastomer, impact copolymer and low density polyethylene that are suitable for roofing applications, particularly roofing membranes. The polymer blends provide a balance of rheological properties over a wide range of temperatures, and especially exhibit excellent melt strength and strain hardening, allowing roofing membranes comprising the polymer blends to be made at high, commercially desirable manufacturing rates.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and can refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations can include isotactic, syndiotactic and atactic symmetries. The term "blend" as used herein refers to a mixture of two or more polymers.

The term "monomer" or "comonomer," as used herein, refers to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends can be produced in a single reactor, a series of reactors, or parallel reactors and are reactor grade blends. Reactor blends can be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device. As used herein, the terms "polypropylene," "propylene polymer," and "propylene-based polymer" refer to a polymer or copolymer comprising at least 50 mol % propylene units (preferably at least 70 mol % propylene units, more preferably at least 80 mol % propylene units, even more preferably at least 90 mol % propylene units, even more preferably at least 95 mol % propylene units or 100 mol % propylene units (in the case of a homopolymer)). Furthermore, the term "polypropylene composition" means a composition containing one or more polypropylene components.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

As used herein, an ethylene polymer having a density of 0.910 to 0.940 g/cm$^3$ is referred to as a "low density polyethylene" (LDPE); an ethylene polymer having a density of 0.890 to 0.940 g/cm$^3$, typically from 0.915 to 0.930 g/cm$^3$, that is linear and does not contain a substantial amount of long-chain branching is referred to as "linear low density polyethylene" (LLDPE) and is produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.97 or above, preferably 0.98 or above); and an ethylene polymer having a density of more than 0.940 g/cm³ is referred to as a "high density polyethylene" (HDPE).

As used herein, when a polymer is referred to as comprising a monomer, the monomer is present in the polymer in the polymerized form of the monomer or in the derivative form of the monomer. The term "derived units" as used herein, refers to the polymerized form of the monomer from which the polymer was derived. For example, when a copolymer is said to have a "propylene" content of 35 wt % to 55 wt %, it is understood that the monomer unit in the copolymer is derived from propylene in the polymerization reaction and said derived units are present at 35 wt % to 55 wt %, based upon the weight of the copolymer.

As used herein, "wt %" means weight percent, "mol %" means mole percent, "vol %" means volume percent, and all molecular weights, e.g., Mw, Mn, Mz, are in units of g/mol, unless otherwise noted. Furthermore, all molecular weights are Mw unless otherwise noted.

As used herein, when a polymer is said to comprise a certain percentage, wt %, of a monomer, that percentage of monomer is based on the total amount of monomer units in the polymer.

As used herein "consisting essentially of" means that the described/claimed composition does not include any other components that will materially alter its properties by any more than 5% of that property, and in any case, does not include any other component to a level greater than 3 wt %.

As used herein, "substantially no," and "substantially free of" are intended to mean that the subject item is not intentionally used or added in any amount, but can be present in very small amounts existing as impurities resulting from environmental or process conditions.

Propylene-Based Elastomer

In any embodiment, the propylene-based elastomer is a random copolymer having crystalline regions interrupted by non-crystalline regions and within the range from 5 to 25 wt %, by weight of the propylene-based elastomer, of ethylene or C4 to C10 α-olefin derived units, and optionally diene-derived units, the remainder of the polymer being propylene-derived units. Not intended to be limited by any theory, it is believed that the non-crystalline regions can result from regions of non-crystallizable polypropylene segments and/or the inclusion of comonomer units. The crystallinity and the melting point of the propylene-based elastomer are reduced compared to highly isotactic polypropylene by the introduction of errors (stereo and region defects) in the insertion of propylene and/or by the presence of comonomer. The copolymer contains at least 60 wt % propylene-derived units by weight of the propylene-based elastomer. In any embodiment, the propylene-based elastomer is a propylene-based elastomer having limited crystallinity due to adjacent isotactic propylene units and a melting point as described herein. In other embodiments, the propylene-based elastomer is generally devoid of any substantial intermolecular heterogeneity in tacticity and comonomer composition, and also generally devoid of any substantial heterogeneity in intramolecular composition distribution.

The propylene-based elastomer contains greater than 50 wt %, preferably greater than 60 wt %, more preferably greater than 65 wt %, even more preferably greater than 75 wt % and up to 99 wt % propylene-derived units, based on the total weight of the propylene-based elastomer. In some preferable embodiments, the propylene-based elastomer includes propylene-derived units in an amount based on the weight of propylene-based elastomer of from 75 wt % to 95 wt %, more preferably 75 wt % to 92.5 wt %, and even more preferably 82.5 wt % to 92.5 wt %, and most preferably 82.5 wt % to 90 wt %. Correspondingly, the units, or comonomers, derived from at least one of ethylene or a C4 to C10 α-olefin can be present in an amount of 5, or 10, or 14 wt % to 22, or 25 wt % by weight of the elastomer.

The comonomer content can be adjusted so that the propylene-based elastomer having a heat of fusion of 100 J/g or less, or 75 J/g or less, a melting point ($T_m$) of 100° C. or 90° C. or less, and crystallinity of 2% to 65% of isotactic polypropylene, and preferably a melt flow rate ("MFR"), as measured at 230° C. and 2.16 kg weight, of less than 800 g/10 min.

The propylene-based elastomer can comprise more than one comonomer. Preferred embodiments of a propylene-based elastomer have more than one comonomer including propylene-ethylene-octene, propylene-ethylene-hexene, and propylene-ethylene-butene copolymers.

In embodiments where more than one comonomers derived from at least one of ethylene or a C4 to C10 α-olefins are present, the amount of each comonomer can be less than 5 wt % of the propylene-based elastomer, but the combined amount of comonomers by weight of the propylene-based elastomer is 3 wt % or greater.

In preferred embodiments, the comonomer is ethylene, 1-hexene, or 1-octene, and preferably in an amount of 3, 5, 10, or 14 wt % to 15, 20, 22, or 25 wt %, based on the total weight of the propylene-based elastomer. The comonomer content of the propylene-based elastomer can also range from about 3 to about 35 wt %; about 3 to 15 wt %; and about 10 to 15 wt %, based on the total weight of the propylene-based elastomer.

In any embodiment, the propylene-based elastomer comprises ethylene-derived units. The propylene-based elastomer can comprise 3, 5, 10, or 14 wt % to 15, 20, 22, or 25 wt % of ethylene-derived units, based on the total weight of the propylene-based elastomer. The ethylene content of the propylene-based elastomer can also range from about 3 to about 35 wt %; about 3 to 15 wt %; and about 10 to 15 wt %, based on the total weight of the propylene-based elastomer. In any embodiment, the propylene-based elastomer consists essentially of units derived from propylene and ethylene, i.e., the propylene-based elastomer does not contain any other comonomer in an amount typically present as impurities in the ethylene and/or propylene feedstreams used during polymerization or an amount that would materially affect the heat of fusion, melting point, crystallinity, or melt flow rate of the propylene-based elastomer, or any other comonomer intentionally added to the polymerization process.

In any embodiment, diene comonomer units are included in the propylene-based elastomer. Examples of the diene include, but not limited to, 5-ethylidene-2-norbornene, 5-vinyl-2-norbornene, divinylbenzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The amount of diene comonomer is equal to or more than 0 wt %, or 0.5 wt %, or 1 wt %, or 1.5 wt % and lower than, or equal to, 5 wt %, or 4 wt %, or 3 wt % or 2 wt % based on the weight of propylene-based elastomer.

The propylene-based elastomer has a heat of fusion ("$H_f$"), as determined by the Differential Scanning calorimetry ("DSC"), of 100 J/g or less, or 75 J/g or less, 70 J/g or less, 50 J/g or less, or 35 J/g or less. The propylene-based elastomer can have a lower limit $H_f$ of 0.5 J/g, 1 J/g, or 5 J/g. For example, the $H_f$ value can be anywhere from 1.0, 1.5, 3.0, 4.0, 6.0, or 7.0 J/g, to 30, 35, 40, 50, 60, 70, or 75 J/g.

The propylene-based elastomer can have a percent crystallinity, as determined according to the DSC procedure described herein, of 2% to 65%, preferably 0.5% to 40%, preferably 1% to 30%, and more preferably 5% to 35%, of isotactic polypropylene. The thermal energy for the highest order of propylene (i.e., 100% crystallinity) is estimated at 189 J/g. In any embodiment, the copolymer has a crystallinity in the range of 0.25% to 25%, or 0.5% to 22% of isotactic polypropylene.

The propylene-based elastomer can have a triad tacticity of three propylene units (mmm tacticity), as measured by 13C NMR, of 75% or greater, 80% or greater, 85% or greater, 90% or greater, 92% or greater, 95% or greater, or 97% or greater. For example, the triad tacticity can range from about 75 to about 99%, from about 80 to about 99%, from about 85 to about 99%, from about 90 to about 99%, from about 90 to about 97%, or from about 80 to about 97%. Triad tacticity can be determined by the methods described in U.S. Pat. No. 7,232,871.

The propylene-based elastomer can have a tacticity index m/r ranging from a lower limit of 4 or 6 to an upper limit of 8 or 10 or 12. The tacticity index, expressed herein as "m/r", is determined by 13C nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso, and "r" to racemic. An m/r ratio of 1.0 generally describes a syndiotactic polymer, and an m/r ratio of 2.0 describes an atactic material. The propylene-based elastomer can have a single peak melting transition as determined by DSC. In any embodiment, the copolymer has a primary peak transition of 90° C. or less, with a broad end-of-melt transition of 110° C. or greater. The peak "melting point" ("Tm") is defined as the temperature of the greatest heat absorption within the range of melting of the sample. However, the copolymer can show secondary melting peaks adjacent to the principal peak, and/or at the end-of-melt transition. For the purposes of this disclosure, such secondary melting peaks are considered together as a single melting point, with the highest of these peaks being considered the Tm of the propylene-based elastomer. The propylene-based elastomer can have a Tm of 100° C. or less, 90° C. or less, 80° C. or less, or 70° C. or less. In any embodiment, the propylene-based elastomer can have a Tm of 25° C. to 100° C., 25° C. to 85° C., 25° C. to 75° C., or 25° C. to 65° C. In any embodiment, the propylene-based elastomer can have a Tm of 30° C. to 80° C. or 30° C. to 70° C.

For the thermal properties of the propylene-based elastomers, Differential Scanning calorimetry ("DSC") was used. Such DSC data was obtained using a Perkin-Elmer DSC 7.5 mg to 10 mg of a sheet of the polymer to be tested was pressed at approximately 200° C. to 230° C., then removed with a punch die and annealed at room temperature for 48 hours. The samples were then sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity. The percent crystallinity (X %) was calculated using the formula, X %=[area under the curve (Joules/gram)/B(Joules/gram)]*100, where B is the heat of fusion for the homopolymer of the major monomer component. These values for B were found from the Polymer Handbook, Fourth Edition, published by John Wiley and Sons, New York 1999. A value of 189 J/g (B) was used as the heat of fusion for 100% crystalline polypropylene. The melting temperature was measured and reported during the second heating cycle (or second melt).

In one or more embodiments, the propylene-based elastomer can have a Mooney viscosity [ML (1+4) @ 125° C.], as determined according to ASTM D-1646, of less than 100, in other embodiments less than 75, in other embodiments less than 60, and in other embodiments less than 30.

The propylene-based elastomer can have a density of 0.850 g/cm$^3$ to 0.920 g/cm$^3$, 0.860 g/cm$^3$ to 0.900 g/cm$^3$, or 0.860 g/cm$^3$ to 0.890 g/cm$^3$, at room temperature as measured per ASTM D-1505.

The propylene-based elastomer can have a melt flow rate ("MFR") greater than 0.5 dg/min, and less than or equal to 1,000 dg/min, or less than or equal to 800 dg/min, less than or equal to 500 dg/min, less than or equal to 200 dg/min, less than or equal to 100 dg/min, or less than or equal to 50 dg/min. Some embodiments can include a propylene-based elastomer with an MFR of less than or equal to 25 dg/min, such as from 1 to 25 dg/min or 1 to 20 dg/min. The MFR is determined according to ASTM D-1238, condition L (2.16 kg, 230° C.).

The propylene-based elastomer can have a weight average molecular weight ("Mw") of 5,000 to 5,000,000 g/mole, 10,000 to 1,000,000 g/mole, or 50,000 to 400,000 g/mole; a number average molecular weight ("Mn") of 2,500 to 2,500,00 g/mole, 10,000 to 250,000 g/mole, or 25,000 to 200,000 g/mole; and/or a z-average molecular weight ("Mz") of 10,000 to 7,000,000 g/mole, 80,000 to 700,000 g/mole, or 100,000 to 500,000 g/mole. The propylene-based elastomer can have a molecular weight distribution (Mw/Mn, or "MWD") of 1.5 to 20, or 1.5 to 15, 1.5 to 5, 1.8 to 5, or 1.8 to 4.

The propylene-based elastomer can have an Elongation at Break of less than 2000%, less than 1000%, or less than 800%, as measured per ASTM D412.

The propylene-based elastomer can also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene can be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based elastomer composition comprises a diene, the diene can be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, where the percentage by weight is based upon the total weight of the propylene-derived, α-olefin derived, and diene-derived units.

The propylene-based elastomer can be grafted (i.e., "functionalized") using one or more grafting monomers. As used herein, the term "grafting" denotes covalent bonding of the grafting monomer to a polymer chain of the propylene-based elastomer. The grafting monomer can be or include at least one ethylenically unsaturated carboxylic acid or acid derivative, such as an acid anhydride, ester, salt, amide, imide, or acrylates. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxylethyl methacrylate and higher hydroxy-alkyl methacrylates and glycidyl methacrylate. Maleic anhydride can be used as a grafting monomer. In embodiments where the graft monomer is maleic anhydride, the maleic anhydride concentration in the grafted polymer can be to about 6 wt %, at least about 0.5 wt %, or at least about 1.5 wt % based on the total weight of the propylene-based elastomer.

In some embodiments, the propylene-based elastomer can be a reactor blended polymer as defined herein. That is, the propylene-based elastomer is a reactor blend of a first polymer component and a second polymer component. Thus, the comonomer content of the propylene-based elastomer can be adjusted by adjusting the comonomer content of the first polymer component, adjusting the comonomer content of second polymer component, and/or adjusting the ratio of the first polymer component to the second polymer component present in the propylene-based elastomer.

In embodiments where the propylene-based elastomer is a reactor blended polymer, the α-olefin content of the first polymer component ("R1") can be greater than 5 wt % α-olefin, greater than 7 wt % α-olefin, greater than 10 wt % α-olefin, greater than 12 wt % α-olefin, greater than 15 wt α-olefin, or greater than 17 wt α-olefin, where the percentage by weight is based upon the total weight of the propylene-derived and α-olefin-derived units of the first polymer component. The α-olefin content of the first polymer component can be less than 30 wt % α-olefin, less than 27 wt % α-olefin, less than 25 wt % α-olefin, less than 22 wt % α-olefin, less than 20 wt % α-olefin, or less than 19 wt % α-olefin, where the percentage by weight is based upon the total weight of the propylene-derived and α-olefin-derived units of the first polymer component. In some embodiments, the α-olefin content of the first polymer component can range from 5 wt % to 30 wt % α-olefin, from 7 wt % to 27 wt % α-olefin, from 10 wt % to 25 wt α-olefin, from 12 wt % to 22 wt α-olefin, from 15 wt % to 20 wt % α-olefin, or from 17 wt % to 19 wt % α-olefin. The first polymer component can comprise propylene and ethylene, and in some embodiments the first polymer component can consist only of propylene and ethylene derived units.

In embodiments where the propylene-based elastomer is a reactor blended polymer, the α-olefin content of the second polymer component ("R2") can be greater than 1.0 wt % α-olefin, greater than 1.5 wt % α-olefin, greater than 2.0 wt % α-olefin, greater than 2.5 wt % α-olefin, greater than 2.75 wt % α-olefin, or greater than 3.0 wt % α-olefin, where the percentage by weight is based upon the total weight of the propylene-derived and α-olefin-derived units of the second polymer component. The α-olefin content of the second polymer component can be less than 10 wt % α-olefin, less than 9 wt % α-olefin, less than 8 wt % α-olefin, less than 7 wt % α-olefin, less than 6 wt % α-olefin, or less than 5 wt % α-olefin, where the percentage by weight is based upon the total weight of the propylene-derived and α-olefin-derived units of the second polymer component. In some embodiments, the α-olefin content of the second polymer component can range from 1.0 wt % to 10 wt α-olefin, or from 1.5 wt % to 9 wt % α-olefin, or from 2.0 wt % to 8 wt % α-olefin, or from 2.5 wt % to 7 wt % α-olefin, or from 2.75 wt % to 6 wt % α-olefin, or from 3 wt % to 5 wt % α-olefin. The second polymer component can comprise propylene and ethylene, and in some embodiments the first polymer component can consist only of propylene and ethylene derived units.

In embodiments where the propylene-based elastomer is a reactor blended polymer, the propylene-based elastomer can comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the propylene-based elastomer. The propylene-based elastomer can comprise from 75 to 99 wt % of the first polymer component, from 80 to 97 wt % of the first polymer component, from 85 to 93 wt % of the first polymer component, or from 82 to 92 wt % of the first polymer component, based on the weight of the propylene-based elastomer.

The propylene-based elastomer can be prepared by any suitable means as known in the art. The propylene-based elastomer can be prepared using homogeneous conditions, such as a continuous solution polymerization process, using a metallocene catalyst. In some embodiments, the propylene-based elastomer can be prepared in parallel solution polymerization reactors, such that the first reactor component is prepared in a first reactor and the second reactor component is prepared in a second reactor, and the reactor effluent from the first and second reactors are combined and blended to form a single effluent from which the final propylene-based elastomer is separated. Exemplary methods for the preparation of propylene-based elastomers can be found in U.S. Pat. Nos. 6,881,800; 7,803,876; 8,013,069; and 8,026,323 and PCT Publications WO 2011/087729; WO 2011/087730; and WO 2011/087731.

Commercial examples of such propylene-based elastomers include Vistamaxx™ performance polymers from ExxonMobil Chemical Company, Tafmer™ elastomers from Mitsui Chemicals, and Versify™ elastomers from Dow Chemical Company.

Impact Copolymer

The ICPs described herein are made by physically blending polypropylene homopolymer component(s) and propylene-copolymer component(s) or made in a single reactor process using dual catalysts to produce the different components, or are produced in a series reactor process to produce individual components that are further combined in situ, or in one or more of the reactors. The ICPs can be produced in series reactors wherein the polypropylene homopolymer can be first produced in one or more slurry reactors by contacting a catalyst and monomers, preferably propylene, such as in slurry-loop reactors well known in the art, followed by combining the same catalyst and formed homopolymer in a single gas-phase reactor with monomers, preferably propylene and ethylene and/or C4 to C10 α-olefins, to produce the propylene copolymer such that the copolymer imbeds itself in the homopolymer as discrete domains with the homopolymer as a matrix or "continuous"

phase. The MFR of the individual components can be controlled by, for example, the addition and/or removal of hydrogen from the reactors. Most preferably, the homopolymer can be produced in two loop-slurry reactors in series and each as a similar or same amount of hydrogen, producing homopolymer of nearly the same or the same MFR. The amount of hydrogen in the gas phase reactor can be the same or different from the loop slurry reactor, such level controlled by removing the hydrogen from the homopolymer stream entering the gas phase reactor or at some other stage. A suitable process and apparatus can be described in U.S. Pat. Nos. 9,000,106 and 8,076,419 (column 6, line 6 to column 7, line 16). The systems and processes disclosed therein can be used in a "balanced" reactor scheme where two slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

Suitable ICPs can be or can include a polypropylene homopolymer and within a range of from 10 or 15 or 20, or 22, or 24 wt % to 26, or 28, or 30, or 35, or 40, or 45 wt % of propylene copolymer based on the total weight of the ICP, wherein the copolymer comprises from about 7, or 10, or 15, or 20, or 25, or 30, or 35 wt % to 40 or 45, or 50, or 55 or 60 wt % ethylene, 1-butene, 1-hexene, and/or 1-octene derived units and from 80 to 40 wt % propylene-derived units based on the weight of the propylene copolymer, the propylene-based impact copolymer having a MFR within a range of from 10, or 15, or 20, or 26 g/10 min to 30, or 36, or 40, or 50 g/10 min and an Elongation at Break of greater than 60, or 70, or 80, or 90, or 100% (or within a range from 60 or 80% to 120, or 150, or 300, or 400%). Such an ICP tends to have an improved toughness (T-ICP) compared to other ICPs, described more herein. The propylene copolymer can be an ethylene-propylene copolymer.

Suitable ICPs also can be or include a polypropylene homopolymer and within a range of from 6, or 8, or 10 wt % to 14, or 16, or 20 wt % of propylene copolymer based on the weight of the ICP, wherein the propylene copolymer comprises from 20, or 25, or 30, or 35 wt % to 40, or 45, or 50, or 55, or 60 wt % ethylene, 1-butene, 1-hexene and/or 1-octene derived units and from 80, or 75, or 70, or 65 wt % to 60, or 55, or 50, 45, or 40 wt % propylene-derived units based on the weight of the propylene copolymer, the ICP having a MFR within a range of from 5, or 8, or 12 g/10 min to 20, or 30, or 40, or 50 g/10 min and a surface gloss at 60° of from 40, or 50 to 80, or 90. Such an ICP tends to have an improved gloss (G-ICP) compared to other ICPs, described more herein. Most preferably the propylene copolymer can be an ethylene-propylene copolymer.

The ICP can have a molecular weight distribution (Mw/Mn) within a range from 4, or 5 to 7, or 8. In any embodiment the size exclusion chromatograph (SEC) chromatogram can be unimodals, meaning there can be only one discernable SEC maximum, which can or cannot comprise a shoulder.

In an embodiment, the total comonomer derived unit content, preferably ethylene derived units of the ICP, can be within a range from 2 or 2.5 wt % to 4, or 6, or 10, or 16 wt % by weight of the ICP.

In an embodiment, the melting point temperature of the ICP can be greater than 155, or 160, or 162° C., or within a range from 155, or 160, or 162° C. to 170 or 180° C.

In an embodiment, the polypropylene homopolymer portion of the ICP has an Mw/Mn within a range of from 3.0, or 3.5, or 4.0 to 4.5, or 5.0, or 6.0, or 7.0, or 8.0, or 9.0; and the polypropylene homopolymer portion can also have an Mz/Mw of less than 4, or 3.4, or 3.2, or 3.0, or 2.8, or 2.6, or 2.4, or within a range from 2 to 2.5, or 2.6, or 2.8, or 3, or 3.2, or 3.4, or 4. By "polypropylene homopolymer" it is meant a polymer comprising within a range of from 0, or 0.01, or 0.1, or 0.5 to 2.0, or 3.0 wt %, by weight of the polymer, of ethylene, or C4 to C10 α-olefin-derived units, and most preferably refers to a polymer consisting of propylene-derived units.

In any embodiment the "propylene copolymer" or "copolymer" can be a polymer comprising ethylene, 1-butene, 1-hexene and/or 1-octene derived units, most preferably ethylene derived units.

In an embodiment the isopentad value for the polypropylene homopolymer can be greater than 92, or 94, or 96%, and less than or equal to about 99%.

In an embodiment, in particular for an ICP with high gloss, the MFR of the polypropylene homopolymer can be within a range from 5, or 10, or 15 g/10 min to 20, or 25, or 30, or 40 g/10 min. In embodiments for an impact copolymer with high toughness, the polypropylene homopolymer has a MFR within a range from 80 or 100 g/10 min to 120, or 140, or 160, or 180, or 200, or 220 g/10 min.

In an embodiment, the xylene cold soluble fraction of the ICP described herein, which corresponds to the propylene copolymer portion of the ICP, has a number average molecular weight (Mn) within a range from 50,000 or 60,000 g/mole to 80,000 or 100,000 g/mole. In an embodiment, the propylene copolymer has a weight average molecular weight (Mw) within a range from 150,000, or 180,000, or 200,000 g/mole to 300,000, or 350,000, or 400,000 g/mole. And further, the propylene copolymer component can have a z-average molecular weight (Mz) within a range from 400,000, or 450,000, or 500,000, or 550,000 g/mole to 650,000, or 700,000, or 800,000, or 900,000 g/mole. The propylene copolymer component can have an Mz/Mw of less than 3.0, or 2.8, or 2.6, or 2.4, or within a range from 2.0 to 2.5, or 2.6, or 2.8.

In an embodiment, the propylene copolymer portion of the ICP described herein has an Mw/Mn within a range of from 3.0, or 3.5, or 4.0 to 4.5, or 5.0, or 6.0, or 7.0, or 8.0, or 9.0. The propylene copolymer component has an Mz/Mw of less than 4, or 3.4, or 3.2, or 3.0, or 2.8, or 2.6, or 2.4, or within a range from 2 to 2.5, or 2.6, or 2.8, or 3, or 3.2, or 3.4, or 4.

In an embodiment, the propylene copolymer portion of the ICP described herein has a melt flow rate within a range from 0.1 or 0.2 g/10 min to 0.6, or 0.8, or 1, or 2 g/10 min.

Also, in an embodiment, the propylene copolymer has an intrinsic viscosity (IV) within a range from 2 or 2.2 dL/g to 4, or 4.4, or 5, or 6 dL/g.

The ICP described herein can be heterogeneous, meaning that there are domains of copolymer within a continuous phase of polypropylene homopolymer. Advantageously, the copolymer domains are relatively small, and the two domains are more miscible than prior art ICP heterogeneous domains. Thus, in preferred embodiments of the disclosure the polypropylene homopolymer forms a continuous phase and the copolymer, preferably an ethylene-propylene copolymer, forms copolymer domains having an average size (diameter) of less than 10, or 8, or 5, or 4, or 2 or 1 μm, or within a range of from 0.40, or 0.45, or 0.50 μm to 0.80, or 0.85, or 0.90, or 1, or 2, or 4, or 5, or 8, or 10 μm. Due to this nature of the ICP described herein, the surface of the solid material can have high gloss, and thus, the surface gloss can be greater than 80, or 85, or 90 (ASTM D523), or greater than 70, or 75, or 80, or 85 measured at any one of 20, 60, or 85 degrees.

The ICP described herein can desirably be made in a reactor in granules without further processing if desired. Thus, the impact copolymer in a preferred embodiment comprises reactor grade granules having an average particle size within a range of from 1200, or 1300, or 1400, or 1500 µm to 2000, or 2400, or 2800 µm and produced at a rate greater than 30,000, or 35,000 or 40,000, or 45,000 lbs/hr (13,620 kg/hr or 15,890 kg/hr, or 18,160 kg/hr, or 20,430 kg/hr). There are any number of ways of making the ICP described herein, but preferably it can be manufactured in a two-step, sequential processes that utilizes a solution or slurry-type polymerization process in the presence of a polymerization catalyst, followed by transfer of the homopolymer-active catalyst to a gas phase reactor where it can be further contacted with α-olefin comonomer and propylene to form the copolymer domains within the continuous phase of polypropylene homopolymer. Such processes, individually, are well known in the art, and described for instance in U.S. Pat. No. 8,076,419.

When manufacturing either the homopolymer or copolymer, the properties of each can be tailored to meet certain desired needs to impart desirable final properties in the ICP described herein, and there can be a range of desirable properties that the ICP described herein can possess. For instance, the level of hydrogen in the reactor(s) can be adjusted, as can the polymerization temperature, residence time, identity of solvent (if any), as well as other factors.

In an embodiment, the "tough" ICP (T-ICP) has a Heat Deflection Temperature (HDT) within a range of from 70, or 75, or 80, or 85° C. to 95, or 100, or 115, or 125° C.; or greater than 80, or 84, or 86, or 80, or 92° C. at 66 psi (ASTM D648). In an embodiment, the G-ICP has a HDT within a range of from 100, or 110° C. to 130, or 135, or 140, or 150° C.; or greater than 100 or 110° C. at 66 psi (ASTM D648).

Also, in an embodiment the ICP has a flexural modulus (1% Secant, ASTM D790A) of greater than 200, or 220, or 250, or 300 kpsi, or within a range of from 120, or 130, or 140 kpsi to 200, or 225, or 250, or 300, or 400 kpsi. The tensile strength at yield (ASTM D638) of the ICP described herein can be preferably within a range of from 2500 or 2600 or 2800 psi to 3000, 3500, or 4500, or 5500 psi; or greater than 2800, or 2900, or 3000, or 3200 psi.

One advantage of the T-ICP can be its desirable impact properties. For instance, the notched Izod impact at 23° C. as measured by ASTM D256A of the ICP described herein can be preferably greater than 4, or 5, or 6, or 8 ft-lb/in (213 J/m, or 267 J/m, or 320 J/m, or 426 J/m) (or within a range from 4 or 5, or 6, or 8 ft-lb/in to 10, or 12, or 14 ft-lb/in; 213 or 426 J/m to 533, or 640, or 693 J/m). Also, the notched Izod impact at 23° C. as measured by ISO 180/A can be preferably greater than 8, or 10, or 12, or 14, or 20, or 30, or 40 kJ/m2 (or within a range of from 8 or 10 kJ/m2 to 16, or 20, or 30, or 40, or 50, or 60 kJ/m2).

The disclosure described herein can include compositions of the ICP with other polymeric materials and common additives. Desirable polymeric materials include polypropylene homopolymers (as defined above), propylene-based elastomers (such as Vistamaxx™ performance polymers), ethylene-based plastomers, elastomers such as EP rubber, EPDM, butyl rubber, styrenic copolymers and block copolymers, and other impact copolymers, especially so called "high-comonomer" impact copolymers, which are defined as propylene-based impact copolymers having greater than 44 wt % comonomer-derived units in the copolymer portion. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives. These polymeric materials and additives can be compounded with the ICP described herein by traditional blending such as in a Brabender mixer, or extruded in a single or double screw extruder, and can possibly be formed in to a thermoplastic vulcanizate as can be well known in the art.

In a class of embodiments, the ICP can include a polypropylene homopolymer and within the range of from about 10 to about 45 wt % of propylene copolymer based on the weight of the ICP, wherein the propylene copolymer comprises from about 7 to about 60 wt % ethylene and/or C4 to C10 α-olefin derived units and the remainder propylene-derived units based on the weight of the propylene copolymer, the ICP having an MFR (230° C./2.16 kg) within the range of from about 10 to about 50 g/10 min and an Elongation at Break of greater than 60%. In various embodiments, the ICP can further have one or more of the following properties:

(a) a density (as measured at room temperature based on ASTM D1505) of about 0.860 to about 0.920 g/cm3, or about 0.890 to about 0.910 g/cm3;

(b) a total propylene-derived unit content of from about 88 to about 92 wt %, more preferably from about 90 to about 91 wt %, based on the weight of the ICP;

(c) a flexural modulus (1% Secant, as measured based on ASTM D790A) of within a range of from about 130 to about 200 kpsi, or from about 130 to about 160 kpsi, or from about 140 to about 150 kpsi;

(d) a tensile strength at yield (as measured based on ASTM D638) of from about 2500 to about 4500 psi, or from about 2600 to about 3500 psi, or from about 2800 to about 3000 psi;

(e) a notched Izod impact at 23° C. (as measured based on ISO 180/A) of greater than about 20, or about 30, or about 40 kJ/m2; and (f) a heat deflection temperature (HDT) at 66 psi (as measured based on ASTM D648) of from about 75° C. to about 115° C., or from about 80° C. to about 100° C., or from about 85° C. to about 95° C.

Tensile properties of the ICP are determined according to ASTM D638, including Young's modulus (also called modulus of elasticity), yield stress (also called tensile strength at yield), yield strain (also called elongation at yield), break stress (also called tensile strength at break), and break strain (also called elongation at break). The energy to yield can be defined as the area under the stress-strain curve from zero strain to the yield strain. The energy to break can be defined as the area under the stress-strain from zero strain to the break strain. Injection-molded tensile bars were of either ASTM D638 Type I or Type IV geometry, tested at a speed of 2 inch/min. Compression-molded tensile bars were of ASTM D412 Type C geometry, tested at a speed of 20 inch/min. For compression-molded specimens only: the yield stress and yield strain were determined as the 10% offset values as defined in ASTM D638. Break properties were reported only if a majority of test specimens broke before a strain of about 2000%, which can be the maximum strain possible on the load frame used for testing.

Flexure properties of the ICP are determined according to ASTM D790A, including the 1% secant modulus. Test specimen geometry can be as specified under "Molding Materials (Thermoplastics and Thermosets)", and the support span can be 2 inches.

Heat deflection temperature of the ICP can be determined according to ASTM D648, at 66 psi, on injection-molded specimens.

In one embodiment, the ICP in the coating layer of the film described herein can be present in an amount of from about 30 to about 60 wt %, for example, about 30 wt %, about 35 wt %, about 40 wt %, about 45 wt %, about 50 wt %, about 55 wt %, about 60 wt %, or vary in the range of any combination of the values recited herein, based on total weight of polymer in the coating layer.

The various descriptive elements and numerical ranges disclosed herein for the ICPs described herein and compositions of the ICPs can be combined with other descriptive elements and numerical ranges to describe the disclosure; further, for a given element, any upper numerical limit can be combined with any lower numerical limit described herein. An element can vary in the range of any combination of the values recited herein.

Polyethylene

Suitable polyethylenes are selected from ethylene homopolymers, ethylene copolymers, and compositions thereof. Useful ethylene copolymers include one or more comonomers in addition to ethylene and can be a random copolymer, a statistical copolymer, a block copolymer, and/or compositions thereof. The polyethylene can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Müllhaupt and Hans H. Brintzinger, eds., Springer-Verlag 1995); Resconi et al.; and I, II METALLOCENE-BASED POLYOLEFINS (Wiley & Sons 2000).

Suitable polyethylenes can be produced by free radical initiation at high pressure in a tubular or autoclave reactor as well known in the art. Suitable polyethylenes can have a medium to broad MWD determined according to the procedure disclosed herein of higher than 4, preferably from 5 to 40, and a high level of long chain branching as well as some short chain branching.

Suitable polyethylenes can have a density greater than 0.910 g/cm³ and preferably from 0.920 g/cm³ to 0.940 g/cm³.

Suitable polyethylenes can have a melt index (190° C./2.16 kg) or $MI_{2.1}$ of less than 3.0 g/10 min or less than 2.0 g/10 min, as measured according to ASTM D1238. The $MI_{2.1}$ can also range from a low of about 0.10, 0.15, or 0.20 g/10 min to a high of about 3.0, 4.0, or 5.0 g/10 min.

Suitable polyethylenes can have a melt flow rate (230° C./2.16 kg) or MFR within the range of from about 10 to about 50 g/10 min, as measured according to ASTM D1238. The MFR also can range from a low of about 10, 15 or 20 to a high of about 40, 45 or 50 g/10 min. The MFR also can range from a low of about 10, 12 or 15 to a high of about 20, 35 or 50 g/10 min.

Suitable polyethylenes can also have one or more of the following properties:

1. a Mw of 20,000 g/mol or more, 20,000 to 2,000,000 g/mol, preferably 30,000 to 1,000,000, preferably 40,000 to 200,000, preferably 50,000 to 750,000, using a gel permeation chromatograph ("GPC") according to the procedure disclosed herein; and/or 2. a Tm of 30° C. to 150° C., preferably 30° C. to 140° C., preferably 50° C. to 140° C., more preferably 60° C. to 135° C., as determined by second melting curve based on ASTM D3418; and/or 3. a crystallinity of 5% to 80%, preferably 10% to 70%, more preferably 20% to 60%, preferably at least 30%, or at least 40%, or at least 50%, as determined by enthalpy of crystallization curve based on ASTM D3418 and calculated by the following formula:

Crystallinity %=Enthalpy(J/g)/298(J/g)×100%, wherein 298 (J/g) can be enthalpy of 100% crystallinity polyethylene; and/or 4. a heat of fusion of 300 J/g or less, preferably 1 to 260 J/g, preferably 5 to 240 J/g, preferably 10 to 200 J/g, as determined based on ASTM D3418-03; and/or 5. a crystallization temperature (Tc) of 15° C. to 130° C., preferably 20° C. to 120° C., more preferably 25° C. to 110° C., preferably 60° C. to 125° C., as determined based on ASTM D3418-03; and/or 6. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

Suitable polyethylenes can have a molecular weight distribution (Mw/Mn) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry can be as specified under the ASTM D790 section "Molding Materials (Thermoplastics and Thermosets)," and the support span can be 2 inches (5.08 cm)) of the polyethylene falls in a range of 200 to 1000 MPa, and from 300 to 800 MPa in another embodiment, and from 400 to 750 MPa in yet another embodiment, wherein a desirable polymer can exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In one embodiment, a suitable polyethylene can be or can include less than 20 mol % propylene units (preferably less than 15 mol %, preferably less than 10 mol %, preferably less than 5 mol %, and preferably 0 mol % propylene units).

Suitable polyethylenes can be produced by polymerization of ethylene and, optionally, an alpha-olefin with a catalyst having, as a transition metal component, a bis (n-C3-4 alkyl cyclopentadienyl) hafnium compound, wherein the transition metal component preferably comprises from about 95 mol % to about 99 mol % of the hafnium compound as further described in U.S. Pat. No. 6,956,088.

In another embodiment of the invention, a suitable polyethylene can be or can include an ethylene copolymer, either random or block, of ethylene and one or more comonomers selected from C3 to C20 α-olefins, typically from C3 to C10 α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and C3 to C20 α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer can comprise any upper molecular weight limit with any lower molecular weight limit described herein.

A suitable polyethylene can be or can include ethylene and one or more other monomers selected from the group consisting of C3 to C20 linear, branched or cyclic monomers, and in some embodiments can be a C3 to C12 linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers can be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Suitable linear alpha-olefins useful as comonomers for the ethylene copolymers useful in this invention include C3 to C8 alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to C1 to C10 alkyl groups. Additionally, two adjacent substitutions can be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Suitable diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It can be further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

One or more dienes can be present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene can be added to the polymerization in an amount of from an upper limit of 500 ppm, 400 ppm, or 300 ppm to a lower limit of 50 ppm, 100 ppm, or 150 ppm.

Suitable ethylene copolymers useful herein are preferably a copolymer comprising at least 50 wt % ethylene and having up to 50 wt %, preferably 1 wt % to 35 wt %, even more preferably 1 wt % to 6 wt % of a C3 to C20 comonomer, preferably a C4 to C8 comonomer, preferably hexene or octene, based upon the weight of the copolymer. Preferably these polymers are metallocene polyethylenes (mPEs).

Useful mPE homopolymers or copolymers can be produced using mono- or bis-cyclopentadienyl transition metal catalysts in combination with an activator of alumoxane and/or a non-coordinating anion in solution, slurry, high pressure or gas phase. The catalyst and activator can be supported or unsupported and the cyclopentadienyl rings can be substituted or unsubstituted.

Suitable polyethylenes can include those sold under the tradenames ENABLE™ EXACT™, EXCEED™, ESCORENE™, EXXCO™, ESCOR™, PAXON™, and OPTEMA™ (ExxonMobil Chemical Company, Houston, Tex., USA); DOW™ DOWLEX™, ELITE™, AFFINITY™, ENGAGE™, and FLEXOMER™ (The Dow Chemical Company, Midland, Mich., USA); BORSTAR™ and QUEO™ (Borealis AG, Vienna, Austria); and TAFMER™ (Mitsui Chemicals Inc., Tokyo, Japan).

Blend Compositions

The polymer blends can include at least one propylene-based elastomer, at least one impact copolymer, and at least one low density polyethylene as previously described. The amount of the at least one propylene-based elastomer in the polymer blend can be about 25 wt % to about 60 wt %, or about 30 wt % to about 55 wt %, about 35 wt % to about 50 wt %, or about 40 wt % to about 50 wt %, based on the total weight of the polymer blend. Alternatively, the amount of the at least one propylene-based elastomer in the polymer blend can be at least 20 wt %, 25 wt %, 30 wt %, 35 wt %, 40 wt %, 45 wt %, 50 wt %, or 60 wt %, based on the total weight of the polymer blend. Alternatively, the amount of the at least one propylene-based elastomer in the polymer blend can be less than 60 wt %, 55 wt %, 50 wt %, 45 wt %, 40 wt %, 35 wt %, 30 wt %, or 25 wt %, based on the total weight of the polymer blend.

The amount of the at least one impact copolymer in the polymer blend can be about 20 wt % to about 60 wt %, or about 25 wt % to about 55 wt %, about 25 wt % to about 50 wt %, or about 35 wt % to about 50 wt %, based on the total weight of the polymer blend. Alternatively, the amount of the at least one impact copolymer in the polymer blend can be at least 15 wt %, 20 wt %, 25 wt %, 30 wt %, 35 wt %, 40 wt %, 45 wt %, 50 wt %, or 55 wt %, based on the total weight of the polymer blend. Alternatively, the amount of the at least one impact copolymer in the polymer blend can be less than 60 wt %, 55 wt %, 50 wt %, 45 wt %, 40 wt %, 35 wt %, 30 wt %, 25 wt %, or 20 wt %, based on the total weight of the polymer blend.

The amount of the at least one low density polyethylene in the polymer blend can be about 5 wt % to about 35 wt %, or about 10 wt % to about 35 wt %, about 15 wt % to about 25 wt %, or about 20 wt % to about 25 wt %, based on the total weight of the polymer blend. Alternatively, the amount of the at least one low density polyethylene in the polymer blend can be at least 5 wt %, 10 wt %, 15 wt %, 25 wt %, or 30 wt %, based on the total weight of the polymer blend. Alternatively, the amount of the at least one low density polyethylene in the polymer blend can be less than 45 wt %, 40 wt %, 35 wt %, 30 wt %, 25 wt %, 20 wt %, 15 wt %, or 10 wt %, based on the total weight of the polymer blend.

Additives

The polymer blends provided herein can also contain one or more additives, depending on the intended purpose(s). The desired additives can be incorporated into the polymer blend directly or as part of a masterbatch, i.e., an additive package containing several additives to be added at one time in predetermined proportions. The additive package or masterbatch can be added in any suitable amount to accomplish the desired result.

Suitable additives can include reinforcing and non-reinforcing fillers, antioxidants, stabilizers, processing oils, compatibilizing agents, lubricants (e.g., oleamide), anti-blocking agents, antistatic agents, waxes, coupling agents for the fillers and/or pigment, pigments, flame retardants, antioxidants, and other processing aids known to the art. In some embodiments, the additives can comprise up to about 65 wt %, or up to about 60 wt %, or up to about 55 wt %, or up to about 50 wt % of the roofing composition. In some embodiments, the additives can comprise at least 5 wt %, or at least 10 wt %, or at least 15 wt %, or at least 20 wt %, or at least 25 wt %, or at least 30 wt %, or at least 35 wt %, or at least 40 wt % of the roofing composition.

In some embodiments, the roofing composition can include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition can include flame retardants, such as calcium carbonate, inorganic clays containing water of hydration such as aluminum trihydroxides ("ATH") or Magnesium Hydroxide. For example, calcium carbonate or magnesium hydroxide can be pre-blended into a masterbatch with a thermoplastic resin, such as polypropylene, or a polyethylene, such as linear low density polyethylene. For example, the flame retardant can be pre-blended with a polypropylene, an impact polypropylene-ethylene copolymer, or polyethylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch can then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges can include ranges from any lower limit to any upper limit.

In some embodiments, the roofing composition can include UV stabilizers, such as titanium dioxide or Tinuvin™ XT-850. The UV stabilizers can be introduced into the roofing composition as part of a masterbatch. For example, one or more UV stabilizers can be pre-blended into a masterbatch with a thermoplastic resin, such as polypropylene, or a polyethylene, such as linear low density polyethylene. The one or more UV stabilizers also can be pre-blended with a polypropylene, an impact polypropylene-ethylene copolymer, or polyethylene, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch can then form at least 5 wt %, or at least 7 wt %, or at least 10 wt %, or at least 15 wt %, of the roofing composition. In some embodiments, the roofing composition comprises from 5 wt % to 30 wt %, or from 7 wt % to 25 wt %, or from 10 wt % to 20 wt % flame retardant masterbatch, where desirable ranges can include ranges from any lower limit to any upper limit.

Still other additives can include antioxidant and/or thermal stabilizers. In an exemplary embodiment, processing and/or field thermal stabilizers can include IRGANOX™ B-225 and/or IRGANOX™ 1010 available from BASF.

Preferably, the one or more additive(s) can be present in an amount of about 0.01 wt % to about 50 wt %, or about 0.1 wt % to about 15 wt %, or from 1 wt % to 10 wt %, based on a total weight of the polymer blend. In a preferred embodiment, a polymer blend includes at least one of an anti-ultraviolet agent and a color masterbatch, particularly in an amount of from about 7 to about 10 wt %, for example, about 7 wt %, 7.5 wt %, 8 wt %, 8.5 wt %, 9 wt %, 9.5 wt %, or 10 wt %, based on total weight of the polymer blend. In another preferred embodiment, a polymer blend includes at least one of an anti-ultraviolet agent, a flame retardant, and a color masterbatch, particularly in an amount of from about 7 to about 10 wt %, for example, about 7 wt %, 7.5 wt %, 8 wt %, 8.5 wt %, 9 wt %, 9.5 wt %, or 10 wt %, based on total weight of the polymer blend Roofing Compositions The polymer blends described herein are particularly useful for roofing applications, such as for thermoplastic polyolefin roofing membranes. Membranes produced from the polymer blends can exhibit a beneficial combination of properties, and in particular exhibit excellent melt strength and strain hardening properties, along with stability at extreme temperatures, such as those from −40° C. to 100° C.

The roofing compositions described herein can be made either by pre-compounding or by in-situ compounding using polymer-manufacturing processes such as Banbury mixing or twin screw extrusion. The polymer blends can then be formed into roofing membranes using conventional sheet extrusion or sheet extrusion laminating techniques. The roofing membranes can be particularly useful in commercial roofing applications, such as on flat, low-sloped, or steep-sloped substrates. In one example, a roofing membrane can be made having a top layer or surface that is a white reflective layer laminated over a bottom layer or bottom surface that is not color pigmented or simply black.

The roofing membranes can be fixed over the base roofing by any means known in the art such as via adhesive material, ballasted material, spot bonding, or mechanical spot fastening. For example, the membranes can be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane can also be fully adhered or self-adhered to an insulation or deck material using an adhesive. Insulation is typically secured to the deck with mechanical fasteners and the flexible membrane is adhered to the insulation.

The roofing membranes can be reinforced with any type of scrim including, but not limited to, polyester, fiberglass, fiberglass reinforced polyester, polypropylene, woven or non-woven fabrics (e.g., Nylon) or combinations thereof. Preferred scrims are fiberglass and/or polyester.

Useful roofing membranes can have a thickness of from 0.1 to 5 mm, or from 0.5 to 4 mm. In some embodiments, a surface layer of the top and/or bottom of the membrane can be textured with various patterns. Texture increases the surface area of the membrane, reduces glare and makes the membrane surface less slippery. Examples of texture designs include, but are not limited to, a polyhedron with a polygonal base and triangular faces meeting in a common vertex, such as a pyramidal base; a cone configuration having a circular or ellipsoidal configurations; and random pattern configurations.

In addition to roofing materials, the blends are useful in protective cover applications favoring a combination of outstanding flexibility, strong bonding strength with substrates, and good mechanical performance, which can be required for use as shelter from elements including wind, rain, and sunlight, etc. Conveniently, the films of the present invention also can be adapted to form tarpaulins for a wide variety of applications, such as, protective covers against weather damages for buildings, unenclosed road, rail goods carrying vehicles or wood piles, and brickwork and masonry. Such tarpaulins can be perforated, which are typically used for medium to large advertising, or for protection on scaffoldings, with the aim of the perforations (from 20% to 70%) to reduce wind vulnerability.

The blends can be combined with colorants, fillers and/or other polymers including other propylene-based elastomers, other impact copolymers, or ethylene-based plastomers, any of which can individually be present from 5 wt % to 20, 30, or 60 wt %, by weight of all the components.

While compositions and methods are described herein in terms of "comprising" various components or steps, the compositions and methods can also "consist essentially of" or "consist of" the various components and steps.

To provide a better understanding of the embodiments of the present invention, the following non-limiting examples of preferred or representative embodiments are given. In no way should the following examples be read to limit, or to define, the scope of the invention.

EXAMPLES

Three-component blends made of a propylene-based elastomer, an impact copolymer and a low density polyethylene (LDPE) were evaluated. In each examples, the propylene based elastomer was VISTAMAXX 6102, the impact copolymer was ICP 7032E2 and the LPDE component was either LD 051.LQ or LD 129.24, all obtained from ExxonMobil Chemical Company.

"Vistamaxx™ 6102" is a propylene-based elastomer containing 16 wt % ethylene-derived units and has a density of 0.862 g/cc (ASTM D1505), a melt index (190° C.; 2.16 kg) of 1.4 g/10 min (ASTM D1238), a melt mass-flow rate (MFR) (230° C.; 2.16 kg) of 3 g/10 min (ASTM D1238), a Shore A durometer hardness of 66 (ASTM D224), and a Vicat softening temperature of 52.2° C. (ASTM D1525).

"ICP 7032E2" is an impact copolymer with a density of 0.90 g/cc (ASTM D1505), a melt mass-flow rate (MFR) (230° C.; 2.16 kg) of 4.0 g/10 min (ASTM D1238), a Rockwell hardness of 87 (ASTM D785), and a deflection temperature of 82.1° C. (ASTM D648, under load of 66 psi unannealed).

LD 051.LQ is a low density polyethylene with a density of 0.92 g/cc (ASTM D1505), a melt index (190° C.; 2.16 kg) of 0.25 g/10 min (ASTM D1238), and a Vicat softening temperature of 90° C. (ASTM D1525).

LD 129.24 is a low density polyethylene with a density of 0.93 g/cc (ASTM D1505), a melt index (190° C.; 2.16 kg) of 2.3 g/10 min (ASTM D1238).

The densities, MI and MFR for each polymer component is listed in Table 1. The detailed compositions of the blends are shown in Table 2. As detailed in Table 2, Comp.Ex. #1 is the market reference, RTPO Hifax™ Ca10a. Hifax™ Ca10A is a reactor thermoplastic polyolefin available from Lyondell/Basell Industries. Hifax™ Ca10A has a density of 0.88 g/cc, a melt flow rate (230° C.; 2.16 kg) of 0.6 g/10 min, a Vicat softening temperature of 60° C., a melting temperature of 142° C., and a Shore D hardness of 30.

Comp.Ex. #2 is a bi-component blend of 50 wt % Vistamaxx™ 6102 and 50 wt % ICP 7032E2. Inventive Blends #3, #4, and #5 contain a fractional melt index LDPE (LD 051.LQ). Inventive Blend #3 further contains ICP as the dominating component. Vistamaxx™ 6102 is the major component in Inventive Blends #4 and #5. For Inventive Blends #6 and #7, a higher melt index LDPE (LD 129.24) was used instead of LD 051.LQ. The weight percent of LD 129.24 in the blend was identical in Inventive Blends #6 and #7, but the VMX/ICP ratios increased from 35/50 to 50/35.

TABLE 1

Resins used in this study, along with their density and MI/MFR.

| Resin name | Density (g/cm$^3$) | MI (g/10 min @190° C./2.16 kg) | MFR (g/10 min @230° C./2.16 kg) |
|---|---|---|---|
| RTPO Ca10a | 0.88 | N/A | 0.6 |
| VMX 6102 | 0.86 | N/A | 3.0 |
| ICP 7032E2 | 0.90 | N/A | 4.0 |
| LDPE LD 051.LQ | 0.92 | 0.25 | N/A |
| LDPE LD 129.24 | 0.93 | 2.3 | N/A |

TABLE 2

Blends evaluated in this study. All numbers represent the weight percentage of each component in the blends.

| | Comp. Ex. 1 | Comp. Ex. 2 | Blend #3 | Blend #4 | Blend #5 | Blend #6 | Blend #7 |
|---|---|---|---|---|---|---|---|
| | | | wt % | | | | |
| RTPO Ca10a | 100 | 0 | 0 | 0 | 0 | 0 | 0 |
| VMX 6102 | 0 | 50 | 35 | 50 | 50 | 35 | 50 |
| ICP 7032E2 | 0 | 50 | 50 | 35 | 25 | 50 | 35 |
| LDPE LD 051.LQ | 0 | 0 | 15 | 15 | 25 | 0 | 0 |
| LDPE LD 129.24 | 0 | 0 | 0 | 0 | 0 | 15 | 15 |

To evaluate the performance of these resin blends, the rheological properties of the blends were characterized. These properties include storage modulus, E', via dynamic temperature mechanical analysis (DMTA), complex viscosity via small amplitude oscillatory shear (SAOS), melt strength and transient extensional viscosity.

The DMTA data was generated with a Rheometric Solid Analyzer (RSA-G2) from TA Instruments using film/fiber fixtures, which imposes a sinusoidal strain on the sample in the tensile mode as a function of temperature. For all experiments, the Rheometric Solid Analyzer was thermally stable at 25° C. for at least 20 minutes in order for the samples to equilibrate. Once the sample is thermally equilibrated, the gap on the tool is zeroed out, then the film/fiber tool was moved to the loading gap (25 mm) and the transducer tared before loading the sample onto the film/fiber tool. All samples were compression molded at 190° C. and set aside to allow the sample to crystallize for at least 24 hours before testing. Samples were cut into 5 mm by 50 mm films with a die cutter. The sample was aligned and centered onto the film/fiber tools and then tightened with a torque screwdriver (20 cN*m). Once the sample was loaded, the FCO oven was closed to allow the sample to equilibrate and a slight tension (10 g) was applied on the sample to keep the sample taught throughout the test. To determine the storage modulus (E'), the temperature was lowered to the starting point at −70° C. using liquid nitrogen and the temperature was ramped up to 100° C. at a rate of 2° C./min at a fixed frequency (1 Hz) and fixed strain (0.05%) applied to each sample.

Dynamic shear melt rheological data was measured with an Advanced Rheometrics Expansion System (ARES-G2) from TA Instruments using parallel plates (diameter=25 mm) in a dynamic mode under nitrogen atmosphere. For all experiments, the rheometer was thermally stable at 190° C. for at least 30 minutes before inserting compression-molded samples of resin onto the parallel plates. To determine the samples viscoelastic behavior, frequency sweeps in the range from 0.1 to 400 rad/s were carried out at a temperature of 190° C. under constant strain. Depending on the molecular weight and temperature, strains in the linear deformation range verified by strain sweep test were used. A nitrogen stream was circulated through the sample oven to minimize chain extension or cross-linking during the experiments. All the samples were compression molded at 190° C. A sinusoidal shear strain was applied to the material if the strain amplitude was sufficiently small or if the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 90° although the stress is in phase with the strain rate). For viscoelastic materials, $0<\delta<90$.

Melt strength refers to the force required to draw a molten polymer extrudate at a rate of 12 mm/s$^2$ at an extrusion temperature of 190° C. until breakage of the extrudate whereby the force is applied by take up rollers.

The transient extensional viscosity was measured using a SER2P Testing Platform available from Xpansion Instruments LLC, Tallmadge, Ohio, USA. The SER Testing Platform was used on a MCR501 rheometer available from Anton Paar. The SER Testing Platform is described in U.S. Pat. Nos. 6,578,413 and 6,691,569, which are incorporated herein for reference. A general description of transient uniaxial extensional viscosity measurements is provided, for example, in "Measuring the transient extensional rheology of polyethylene melts using the SER universal testing platform", The Society of Rheology, Inc., J. Rheol. 49(3), 585-606 (2005), incorporated herein for reference. Strain hardening occurs when a polymer is subjected to elongational flow and the transient extensional viscosity increases with respect to the linear viscoelasticity envelop (LVE). Strain hardening is observed as an abrupt upswing of the extensional viscosity in the transient extensional viscosity vs. time plot.

Figure 2:
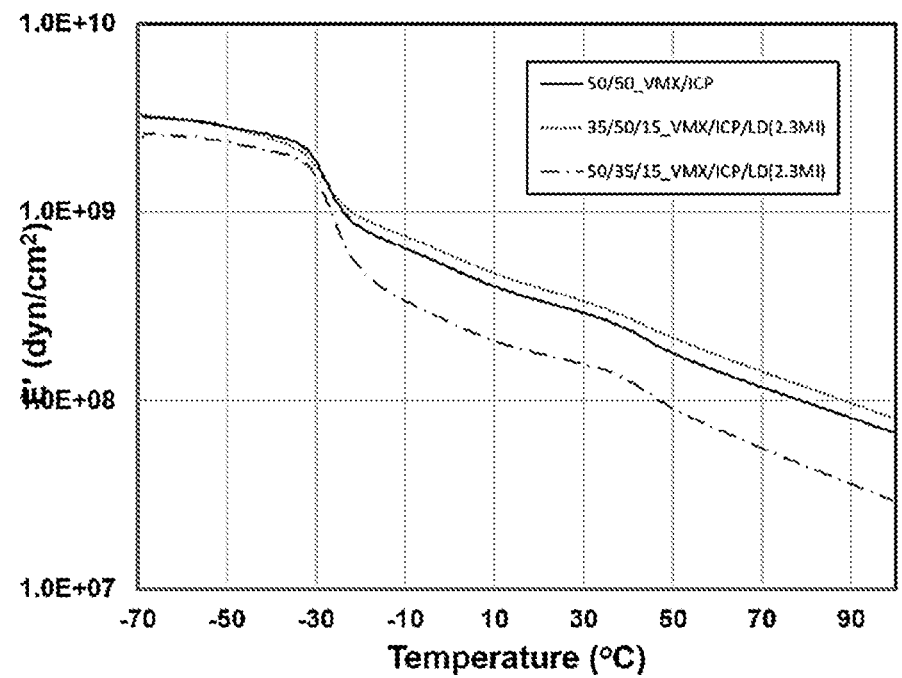
FIG. 2 is a graphical representation showing E' as a function of temperature (DMTA) for the experimental blends 6 and 7, according to one or more embodiments provided herein. The results of the Comp.Ex. #2 are also shown as a comparative reference.

The flexibilities of the materials were first investigated via DMTA. The storage modulus, E', is shown as a function of temperature in FIGS. 1 and 2. The E' of the 50/50 VMX 6102/ICP 7032E2 is believed to be the upper limit for flexibility in the current TPO roofing membrane marketplace, per customer preference. The ICP dominating blends, #3 and #6, demonstrated comparable flexibilities relative to that of blend #2. When VMX 6102 was the major component (blends #4, #5 and #7), the blends were more flexible due to the increasing VMX 6102 to ICP 7032E2 ratio. Consequently, the flexibilities of all LDPE containing blends (#3 to #7) were good, as none of these blends were drastically stiffer than the reference #2.

Figure 3:
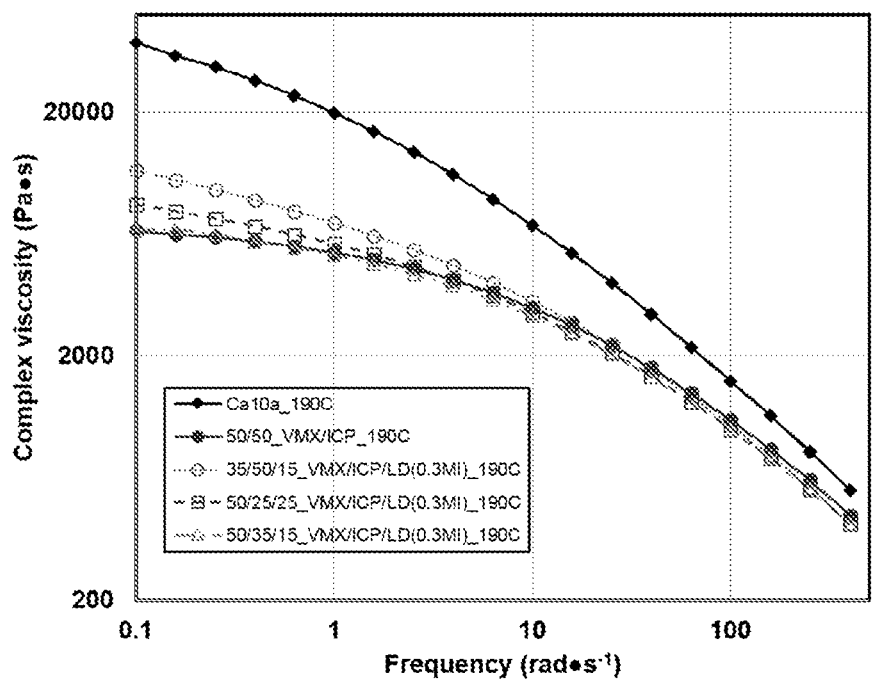
FIG. 3 is a graphical representation showing complex viscosity as a function of shear rate (SAOS) at 190° C. for the experimental blends 3 to 5, according to one or more embodiments provided herein. The results of the Comp.Ex. #2 are also shown as a comparative reference.
Figure 4:
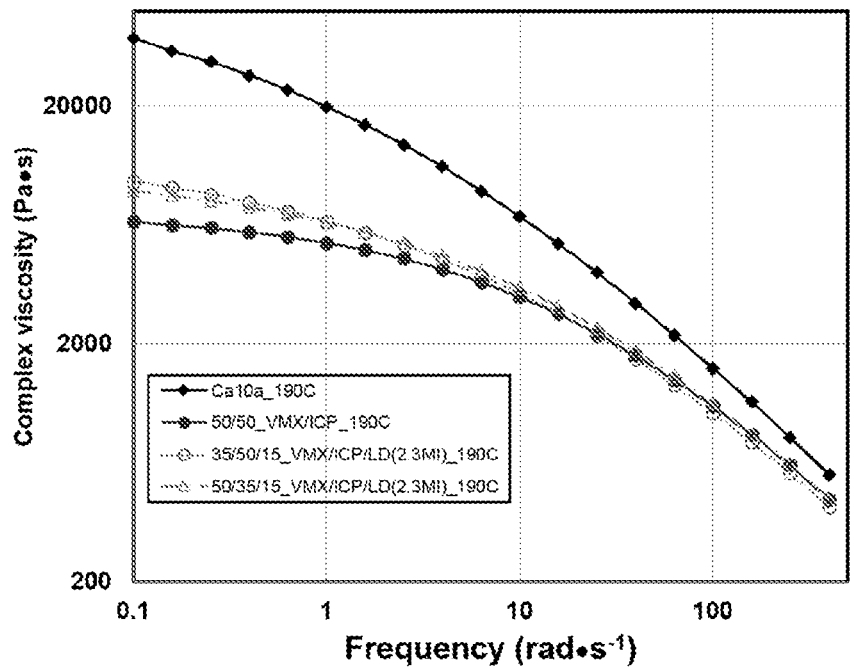
FIG. 4 is a graphical representation showing complex viscosity as a function of shear rate (SAOS) at 190° C. for the experimental blends 6 and 7, according to one or more embodiments provided herein. The results of the Comp.Ex. #2 are also shown as a comparative reference.

The shear viscosity profiles are shown in FIGS. 3 and 4. The addition of the more viscous LDPE raised the viscosity of the blends in the low shear rate region (<1 s-1). In the high shear rate range (>10 s-1), the viscosity curves of the tri-component blends overlapped with that of Comp.Ex. #2. The propylene-based elastomer blends (#2 to #7) are less viscous than the RTPO Ca10a. Lower viscosity benefits sheet extrusion as it allows lower energy consumption and less viscous heating.

Figure 5:
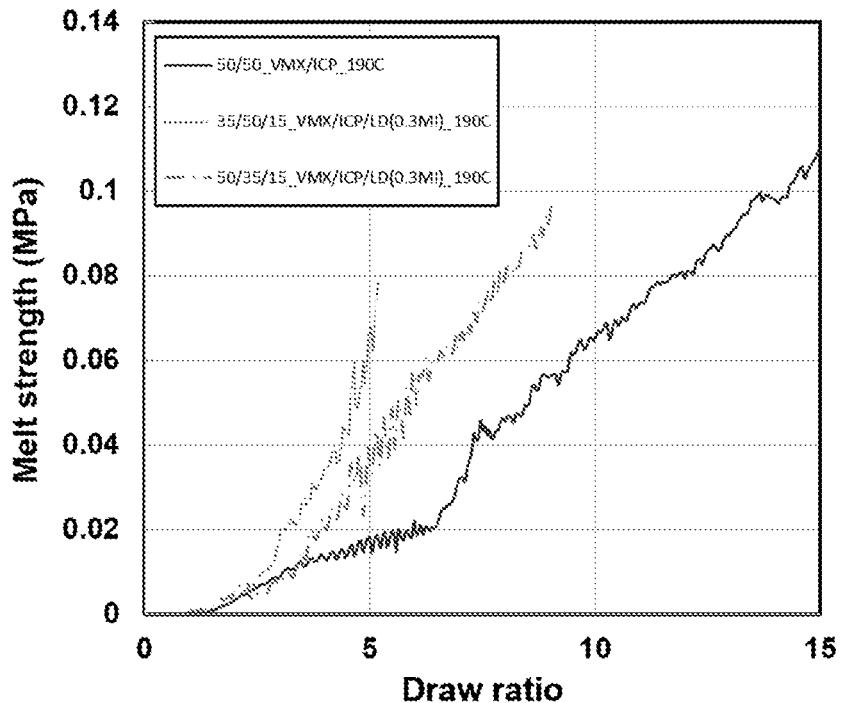
FIG. 5 is a graphical representation showing melt strength at 190° C. for the experimental blends 3 to 5, according to one or more embodiments provided herein. The results of the Comp.Ex. #2 are also shown as a comparative reference.
Figure 6:
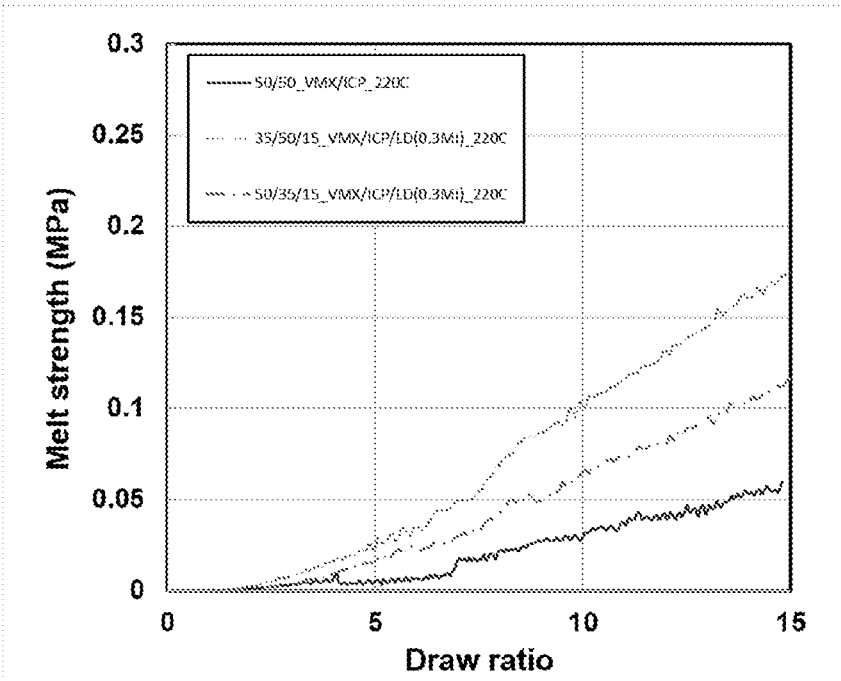
FIG. 6 is a graphical representation showing melt strength at 220° C. for the experimental blends 3 to 5, according to one or more embodiments provided herein. The results of the Comp.Ex. #2 are also shown as a comparative reference.
Figure 7:
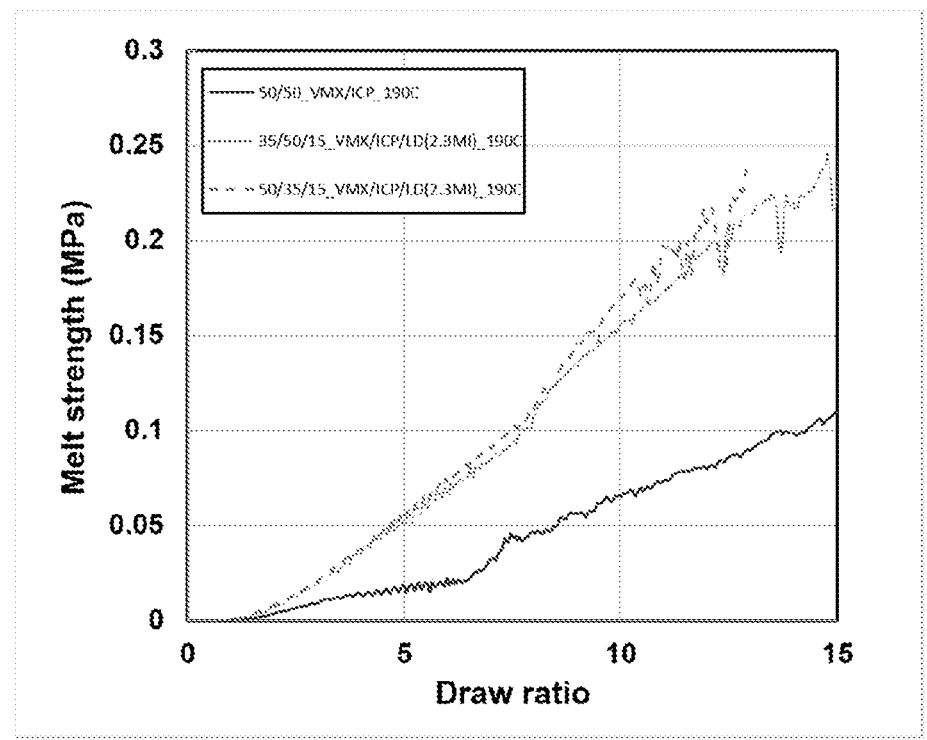
FIG. 7 is a graphical representation showing melt strength at 190° C. for the experimental blends 6 and 7, according to one or more embodiments provided herein. The results of the Comp.Ex. #2 are also shown as a comparative reference.
Figure 8:
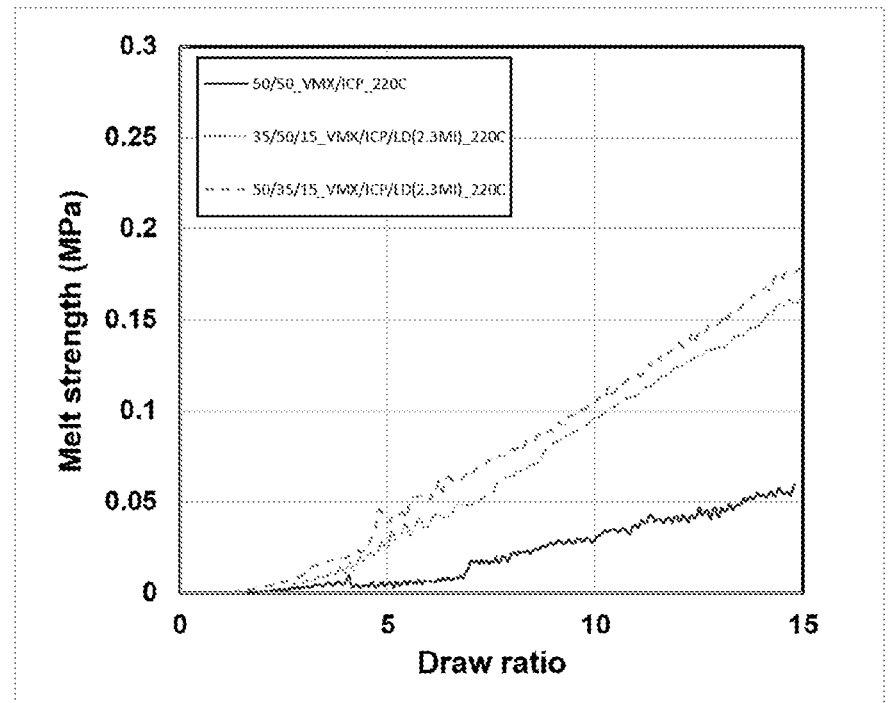
FIG. 8 is a graphical representation showing melt strength at 220° C. for the experimental blends 6 and 7, according to one or more embodiments provided herein. The results of the Comp.Ex. #2 are also shown as a comparative reference.
Figure 9:
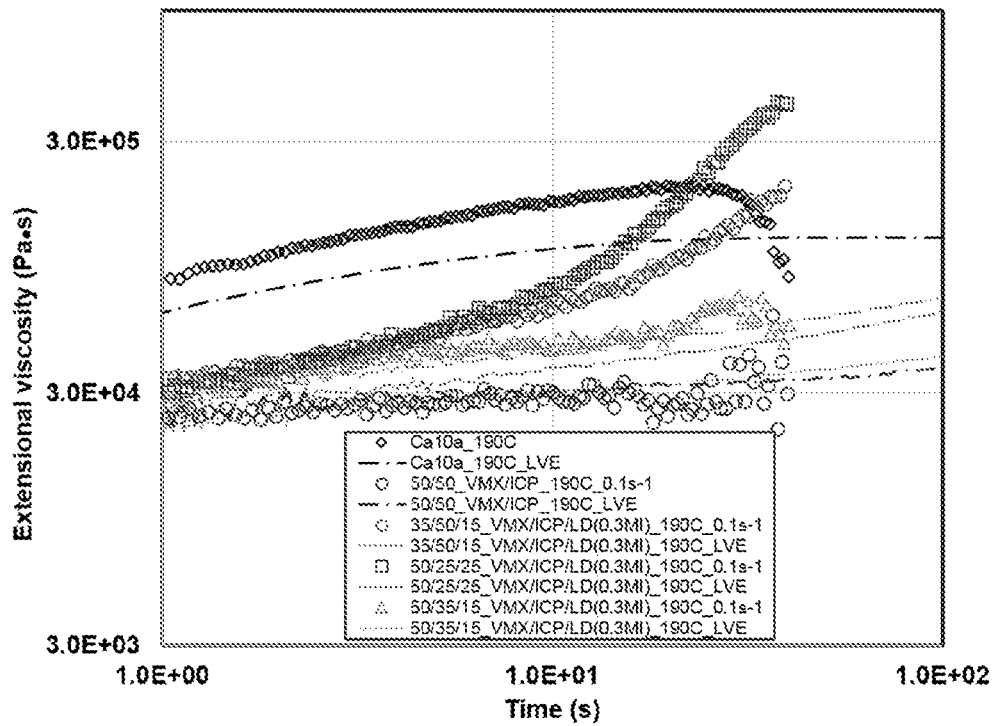
FIG. 9 is a graphical representation showing transient extensional viscosity growth at 190° C., 0.1 s$^{-1}$, for the experimental blends 3 to 5, according to one or more embodiments provided herein. The results of the Comp.Ex. #1 and #2 are also shown as a comparative reference.
Figure 10:
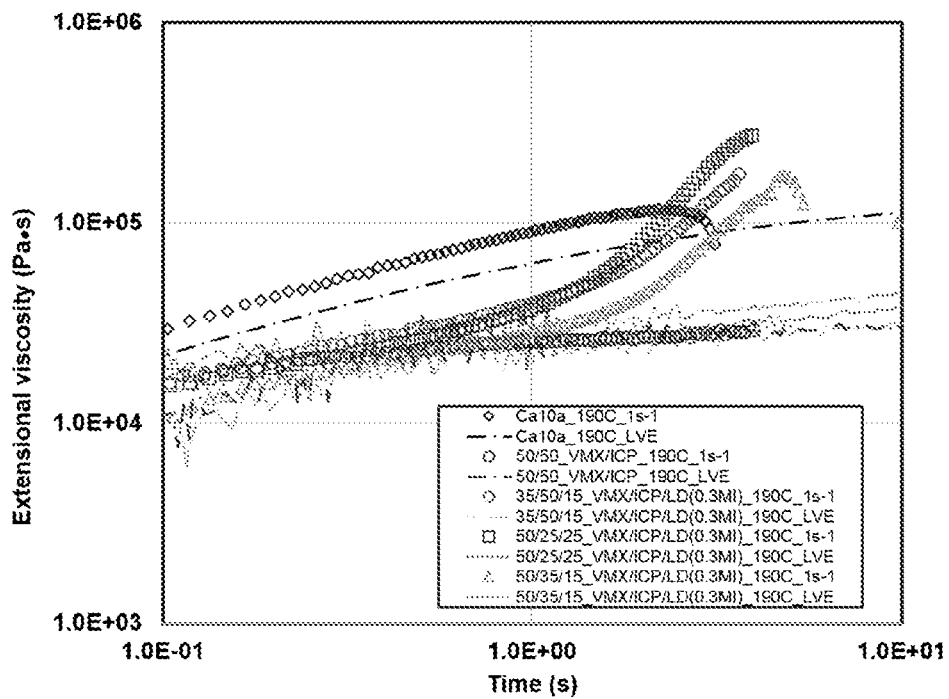
FIG. 10 is a graphical representation showing transient extensional viscosity growth at 190° C., 1 s$^{-1}$, for the experimental blends 3 to 5, according to one or more embodiments provided herein. The results of the Comp.Ex. #1 and #2 are also shown as a comparative reference.

The melt strength results are presented in FIGS. 5 to 8. FIGS. 5 and 6 show the melt strength of the blends with LDPE LD 051.LQ at 190° C. and 220° C., respectively. It can be observed that the incorporation of LD 051.LQ significantly enhanced the melt strength in comparison to the Comp.Ex. #2. At 220° C. and 10 draw ratio, the melt strength of Blends #3 and #4 were 3× and 2× higher than Comp.Ex. #2, respectively. Similar to LD 051.LQ, the LD 129.24 component introduced a dramatic enhancement in melt strength, as shown in FIGS. 7 and 8. At 220° C. and 10 draw ratio, Blends #6 and #7 were 3× higher than that of the Comp.Ex. #2.

Figure 11:
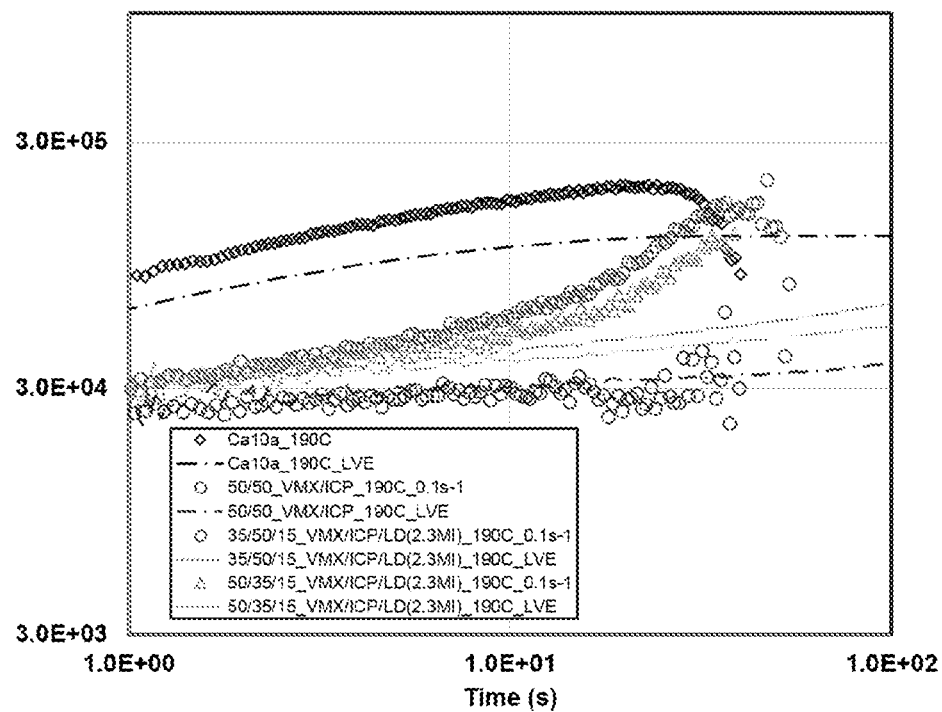
FIG. 11 is a graphical representation showing transient extensional viscosity growth at 190° C., 0.1 s$^{-1}$, for the experimental blends 6 and 7, according to one or more embodiments provided herein. The results of the Comp.Ex. #1 and #2 are also shown as a comparative reference.
Figure 12:
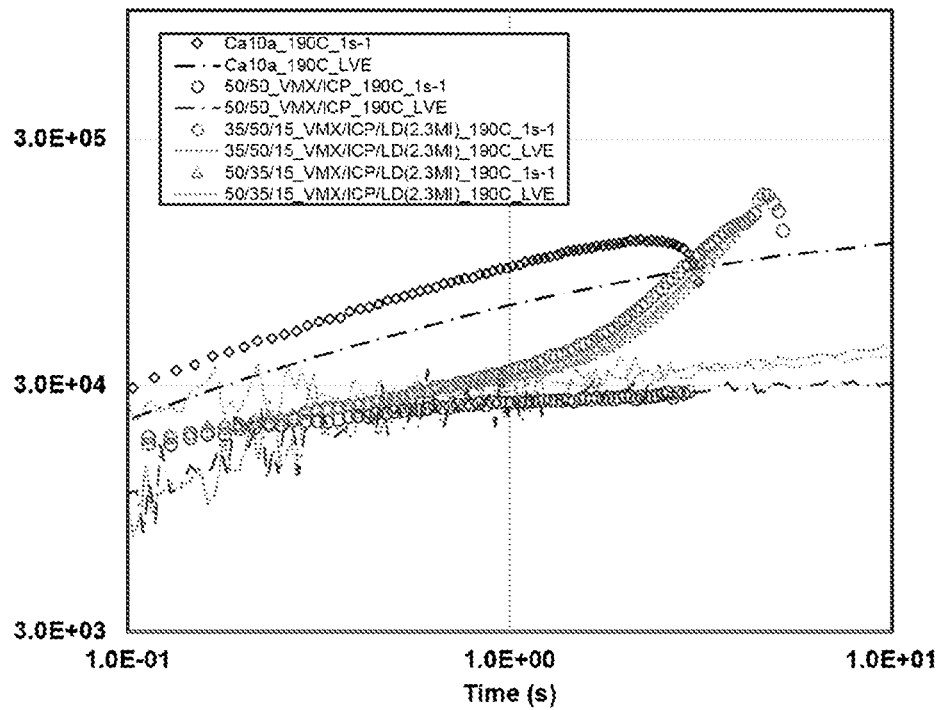
FIG. 12 is a graphical representation showing the transient extensional viscosity growth at 190° C., 1 s$^{-1}$, for the experimental blends 6 and 7, according to one or more embodiments provided herein. The results of the Comp.Ex. #1 and #2 are also shown as a comparative reference.

FIGS. 9 to 12 show the growth of transient extensional viscosity. All measurements were performed at 190° C. For each blend, two extensional rates, 0.1 and 1 s$^{-1}$, were used. Neither the Ca10a (Comp.Ex. #1) nor the reference blend (Comp.Ex. #2) exhibited strain hardening. In contrast, all Blends #3 to #7 with LDPE demonstrated strain hardening. The degree of strain hardening was mainly dependent on the content of LDPE in the blends. Take blends containing LDPE LD051.LQ (#3, #4 and #5) for example, blend #5 had the higher content of LDPE relative to that of #3 and #4. Consequently, blend #5's resistance to extension with increasing strain was more significant than the blends with a lower LDPE content, which are blends #3 and #4. In contrast, blends #3 and #4 exhibited comparable strain hardening behavior, as they had the same content of LDPE. For blends #6 and #7 with the same LDPE content, identical strain hardening was observed, as shown in FIGS. 11 and 12, respectively.

In summary, RTPO Hifax™ Ca10a (Comp.Ex. #1) is the current industry preference for single ply roofing membranes. The addition of LDPE (Blends #3-7) significantly improved flexibility, melt strength, and shear viscosity in comparison to Comp.Ex. #2. Blends #3-#7 also provided strain hardening, which was not seen in current roofing solutions, for example, Comp.Ex. #1. Strain hardening is a critical behavior in sheet extrusion lamination to create uniform sheet edges and stabilize sheet dimensions. The strain hardening of the three-component blends is a significant advantage and benefit over the industry preference RTPO Hifax™ Ca10a (Comp.Ex. #1).

The inventors have thus identified an optimal composition that achieves desirable flexibility to allow rolling of the roof membrane, but sufficient integrity to reduce the risk of adhesion of adjacent sheet surfaces while rolled, known as "roll blocking," as well as balancing increased flexibility while maintaining processability. To increase flexibility while avoiding roll blocking, the roofing compositions include 50 to 65 wt % of VMX6102 and LDPE. The compound includes at least 50 wt % of these two components in order to achieve sufficient flexibility. The rigidity of the three components increase in the order of VMX6102<LDPE<ICP7032E2. When ICP7032E2 becomes the dominating ingredient (e.g., greater than 60 wt %), the compound is too rigid, which results in a TPO sheet that is difficult to roll up.

The composition includes at least 30 wt % ICP in order to avoid roll blocking. Both VMX6102 and LDPE are amorphous. TPO compounds having high levels of amorphous content permit polar additives (AO and UV stabilizers, for example) to easily migrate to the sheet surfaces; this causes affiliation of adjacent sheet surfaces. The roll blocking issue is significant when TPO membrane rolls are stored under high temperatures. As a result, maintaining the ICP content of no less than 35 wt % significantly reduces the risk of roll blocking.

The content of LDPE is optimized to preserve the desired flexibility in the compound and roofing article while maintaining processability. LDPE is much more rigid than VMX6102 (e.g., 1% secant modulus of LDPE is 180-320 MPa vs VMX6102 of 14.4 MPa). undesirable. Conversely, if LDPE composition is too low, no melt strength improvement and strain hardening is introduced.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While the foregoing can be directed to embodiments of the present invention, other and further embodiments of the invention can be devised without departing from the basic scope thereof, and the scope thereof can be determined by the claims that follow.

What can be claimed is:

1. A roofing membrane, comprising:
   60 wt % to 70 wt % of a polymer blend comprising:
      35 wt % to 50 wt % of at least one propylene-based elastomer, based on the total weight of the polymer blend, the at least one propylene-based elastomer having a heat of fusion less than about 80 J/g as determined by DSC, a density of 0.850 g/cm$^3$ to 0.920 g/cm$^3$ per ASTM D-1505, crystallinity of 2% to 65% of isotactic polypropylene and a melting point ($T_m$) of 100° C. or less, wherein the propylene-based elastomer comprises greater than 50 wt % propylene and from about 3 wt % to about 25 wt % units derived from one or more $C_2$ or $C_4$-$C_{12}$ α-olefins, based on a total weight of the propylene-based elastomer;
      25 wt % to 50 wt % of at least one impact copolymer, based on the total weight of the polymer blend, the at least one impact copolymer comprising a propylene homopolymer blended with a propylene copolymer; and
      15 wt % to 25 wt % of at least one low density polyethylene component, based on the total weight of the polymer blend, the at least one low density polyethylene component having a density of 0.920 g/cm$^3$ to 0.940 g/cm$^3$, a melt index @190° C./2.16 kg of about 0.20 g/10 min to about 3.0 g/10 min, as measured according to ASTM D1238, wherein the combined weight of the at least one propylene-based elastomer and the at least one low density polyethylene component is 50 wt % to 65 wt %; and
   30 wt % to 40 wt % of masterbatch comprising an anti-ultraviolet agent, color pigment and fire retardant.

2. The roofing membrane of claim 1, wherein the propylene-based elastomer has a triad tacticity greater than about 90%, as measured by 13C NMR.

3. The roofing membrane of claim 1, wherein the propylene-based elastomer has a density of about 0.85 g/cm$^3$ to about 0.88 g/cm$^3$.

4. The roofing membrane of claim 1, wherein the propylene-based elastomer has a melt flow rate @230° C./2.16 kg of about 2.5 g/10 min to about 3.5 g/10 min, as measured according to ASTM D1238.

5. The roofing membrane of claim 1, wherein the at least one impact copolymer has a melt index @230° C./2.16 kg of about 3.5 g/10 min to about 4.5 g/10 min, as measured according to ASTM D1238.

6. The roofing membrane of claim 1, wherein the at least one impact copolymer has a density of about 0.88 g/cm$^3$ to about 0.95 g/cm$^3$.

7. The roofing membrane of claim 1, wherein the at least one low density polyethylene component has a melt index @190° C./2.16 kg of about 0.20 g/10 min to about 0.30 g/10 min, as measured according to ASTM D1238.

8. The roofing membrane of claim 1, wherein the at least one low density polyethylene component has a melt index @190° C./2.16 kg of about 2.0 g/10 min to about 3.0 g/10 min, as measured according to ASTM D1238.

9. The roofing membrane of claim 1, wherein the propylene-based elastomer comprises about 3 wt % to about 25 wt % units derived from ethylene, based on the total weight of the propylene-based elastomer.

10. The roofing membrane of claim 1, wherein the propylene-based elastomer comprises about 3 wt % to about 15 wt % units derived from ethylene, based on the total weight of the propylene-based elastomer.

11. A roofing membrane, comprising:
   a polymer blend consisting essentially of:
      35 wt % to 50 wt % of at least one propylene-based elastomer, based on the total weight of the polymer blend, the at least one propylene-based elastomer having a heat of fusion less than about 80 J/g as determined by DSC, a density of 0.850 g/cm$^3$ to 0.920 g/cm$^3$ per ASTM D-1505, crystallinity of 2% to 65% of isotactic polypropylene and a melting point ($T_m$) of 100° C. or less, wherein the propylene-based elastomer comprises greater than 50 wt % propylene and from about 3 wt % to about 25 wt % units derived from one or more $C_2$ or $C_4$-$C_{12}$ α-olefins, based on a total weight of the propylene-based elastomer;

25 wt % to 50 wt % of at least one impact copolymer, based on the total weight of the polymer blend, the at least one impact copolymer comprising a propylene homopolymer blended with a propylene copolymer; and about 15 wt % of at least one low density polyethylene component, based on the total weight of the polymer blend, the at least one low density polyethylene component having a density of 0.920 g/cm³ to 0.940 g/cm³, a melt index @190° C./2.16 kg of about 0.20 g/10 min to about 3.0 g/10 min, as measured according to ASTM D1238, wherein the combined weight of the at least one propylene-based elastomer and the at least one low density polyethylene component is 50 wt % to 65 wt %.

12. The roofing membrane of claim 11, wherein the propylene-based elastomer comprises about 3 wt % to about 15 wt % units derived from ethylene, based on the total weight of the propylene-based elastomer.

13. The roofing membrane of claim 11, further comprising 30 wt % to 40 wt % of a masterbatch comprising an anti-ultraviolet agent, color pigment and fire retardant.

14. The roofing membrane of claim 11, wherein the propylene-based elastomer has a density of about 0.85 g/cm³ to about 0.88 g/cm³ and a melt flow rate @230° C./2.16 kg of about 2.5 g/10 min to about 3.5 g/10 min, as measured according to ASTM D1238.

15. The roofing membrane of claim 14, wherein the at least one impact copolymer has a density of about 0.88 g/cm³ to about 0.95 g/cm³ and a melt index @230° C./2.16 kg of about 3.5 g/10 min to about 4.5 g/10 min, as measured according to ASTM D1238.

16. A roofing membrane, comprising:
a polymer blend consisting essentially of:
35 wt % to 50 wt % of at least one propylene-based elastomer, based on the total weight of the polymer blend, the at least one propylene-based elastomer having a heat of fusion less than about 80 J/g as determined by DSC, a density of 0.850 g/cm³ to 0.920 g/cm³ per ASTM D-1505, crystallinity of 2% to 65% of isotactic polypropylene and a melting point ($T_m$) of 100° C. or less, wherein the propylene-based elastomer comprises greater than 50 wt % propylene and from about 3 wt % to about 25 wt % units derived from one or more $C_2$ or $C_4$-$C_{12}$ α-olefins, based on a total weight of the propylene-based elastomer;

25 wt % to 50 wt % of at least one impact copolymer, based on the total weight of the polymer blend, the at least one impact copolymer comprising a propylene homopolymer blended with a propylene copolymer; and about 25 wt % of at least one low density polyethylene component, based on the total weight of the polymer blend, the at least one low density polyethylene component having a density of 0.920 g/cm³ to 0.940 g/cm³, a melt index @190° C./2.16 kg of about 0.20 g/10 min to about 0.3 g/10 min, as measured according to ASTM D1238, wherein the combined weight of the at least one propylene-based elastomer and the at least one low density polyethylene component is 50 wt % to 65 wt %.

17. The roofing membrane of claim 16, wherein the propylene-based elastomer comprises about 3 wt % to about 15 wt % units derived from ethylene, based on the total weight of the propylene-based elastomer.

18. The roofing membrane of claim 16, further comprising 30 wt % to 40 wt % of a masterbatch comprising an anti-ultraviolet agent, color pigment and fire retardant.

19. The roofing membrane of claim 16, wherein the propylene-based elastomer has a density of about 0.85 g/cm³ to about 0.88 g/cm³ and a melt flow rate @230° C./2.16 kg of about 2.5 g/10 min to about 3.5 g/10 min, as measured according to ASTM D1238.

20. The roofing membrane of claim 19, wherein the at least one impact copolymer has a density of about 0.88 g/cm³ to about 0.95 g/cm³ and a melt index @230° C./2.16 kg of about 3.5 g/10 min to about 4.5 g/10 min, as measured according to ASTM D1238.

* * * * *